(12) United States Patent
Kattepur et al.

(10) Patent No.: US 10,824,475 B2
(45) Date of Patent: Nov. 3, 2020

(54) SYSTEMS AND METHODS FOR ESTIMATING COMPUTATION TIMES A-PRIORI IN FOG COMPUTING ROBOTICS

(71) Applicant: Tata Consultancy Services Limited, Mumbai (IN)

(72) Inventors: Ajay Kattepur, Bangalore (IN); Hemant Kumar Rath, Bangalore (IN); Anantha Simha, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 246 days.

(21) Appl. No.: 15/894,322

(22) Filed: Feb. 12, 2018

(65) Prior Publication Data

US 2018/0276049 A1    Sep. 27, 2018

(30) Foreign Application Priority Data

Mar. 24, 2017    (IN) ............................. 201721010424

(51) Int. Cl.
*G06F 9/50*    (2006.01)
*H04L 12/24*    (2006.01)
(Continued)

(52) U.S. Cl.
CPC ........ *G06F 9/5072* (2013.01); *G06F 11/3428* (2013.01); *G06F 11/3442* (2013.01);
(Continued)

(58) Field of Classification Search
CPC ............ G06F 11/3428; G06F 11/3442; G06F 9/5072; H04L 41/0823; H04L 67/10; H04L 67/12; H04W 4/70
(Continued)

(56) References Cited

U.S. PATENT DOCUMENTS

| | | | |
|---|---|---|---|
| 2013/0013834 A1* | 1/2013 | Yamashita | G06F 9/5083 710/240 |
| 2014/0215487 A1* | 7/2014 | Cherkasova | G06F 9/5083 718/106 |
| 2016/0253761 A1 | 9/2016 | Davey et al. | |

FOREIGN PATENT DOCUMENTS

| | | |
|---|---|---|
| CN | 105336002 | 2/2016 |
| WO | WO-2015/051104 | 4/2015 |

OTHER PUBLICATIONS

Kamburugamuve, S. et al. "Cloud-based Parallel Implementation of SLAM for Mobile Robots," *Proceedings of the International Conference on Internet of Things and Cloud Computing*, Cambridge, UK, Mar. 22-23, 2016; 12 pages.

(Continued)

*Primary Examiner* — John H Le
(74) *Attorney, Agent, or Firm* — Finnegan, Henderson, Farabow, Garrett & Dunner, L.L.P.

(57) ABSTRACT

In order to make use of computational resources available at runtime through fog networked robotics paradigm, it is critical to estimate average performance capacities of deployment hardware that is generally heterogeneous. It is also not feasible to replicate runtime deployment framework, collected sensor data and realistic offloading conditions for robotic environments. In accordance with an embodiment of the present disclosure, computational algorithms are dynamically profiled on a development testbed, combined with benchmarking techniques to estimate compute times over the deployment hardware. Estimation in accordance with the present disclosure is based both on Gustafson's law as well as embedded processor benchmarks. Systems and methods of the present disclosure realistically capture parallel processing, cache capacities and differing processing times across hardware.

7 Claims, 12 Drawing Sheets

(51) Int. Cl.
 *H04L 29/08* (2006.01)
 *G06F 11/34* (2006.01)
 *H04W 4/70* (2018.01)
 *G06F 11/30* (2006.01)

(52) U.S. Cl.
 CPC ...... *G06F 11/3466* (2013.01); *H04L 41/0823* (2013.01); *H04L 67/10* (2013.01); *H04L 67/12* (2013.01); *H04W 4/70* (2018.02); *G06F 11/3062* (2013.01); *G06F 11/3419* (2013.01); *G06F 2201/865* (2013.01); *G06F 2201/88* (2013.01)

(58) Field of Classification Search
 USPC ................ 702/176, 177, 178, 186; 710/240; 717/130, 131; 718/106
 See application file for complete search history.

(56) References Cited

OTHER PUBLICATIONS

Portugal, D. et al. (May 2015). "A Distributed and Multithreaded SLAM Architecture for Robotic Clusters and Wireless Sensor Networks," *Cooperative Robots and Sensor Networks*, vol. 604; pp. 121-141.

\* cited by examiner

US 10,824,475 B2

SYSTEMS AND METHODS FOR ESTIMATING COMPUTATION TIMES A-PRIORI IN FOG COMPUTING ROBOTICS

PRIORITY CLAIM

This U.S. patent application claims priority under 35 U.S.C. § 119 to: Indian Patent Application No. 201721010424, filed on 24 Mar. 2017. The entire contents of the aforementioned application are incorporated herein by reference.

TECHNICAL FIELD

The embodiments herein generally relate to fog computing robotics, and more particularly to systems and methods for estimating computation times a-priori in fog computing robotics.

BACKGROUND

Mobile robotic and drone nodes are restricted in computation and battery power, which severely hamper on-board runtime computations. With the emergence of fog networked robotics, computations may be offloaded to robotic peers, smart gateway devices and remote cloud virtual machines. In order to effectively make use of such resources, a-priori estimation of execution times and energy depletion rates of offloaded computational programs are necessary.

SUMMARY

Embodiments of the present disclosure present technological improvements as solutions to one or more of the above-mentioned technical problems recognized by the inventors in conventional systems.

In an aspect, there is provided a processor implemented method comprising: dynamically profiling computational tasks on a development testbed for a-priori estimation of computational time and energy requirements for executing the computational tasks; and extrapolating the computational time and the energy requirements for executing the computational tasks on one or more deployment hardware based on benchmarks and parallel processing models.

In another aspect, there is provided a system comprising: one or more data storage devices operatively coupled to the one or more processors and configured to store instructions configured for execution by the one or more processors to: dynamically profile computational tasks on a development testbed for a-priori estimation of computational time and energy requirements for executing the computational tasks; and extrapolate the computational time and the energy requirements for executing the computational tasks on one or more deployment hardware based on benchmarks and parallel processing models.

In yet another aspect, there is provided a computer program product comprising a non-transitory computer readable medium having a computer readable program embodied therein, wherein the computer readable program, when executed on a computing device, causes the computing device to: dynamically profile computational tasks on a development testbed for a-priori estimation of computational time and energy requirements for executing the computational tasks; and extrapolate the computational time and the energy requirements for executing the computational tasks on one or more deployment hardware based on benchmarks and parallel processing models.

In an embodiment of the present disclosure, the one or more hardware processors are further configured to dynamically profile the computational tasks based on a plurality of hardware performance counters.

In an embodiment of the present disclosure, the one or more deployment hardware is heterogeneous and comprises one or more of robot nodes, fog nodes and cloud virtual machine nodes.

In an embodiment of the present disclosure, the one or more hardware processors are further configured to extrapolate the computational time and the energy requirements based on number of cores and rated frequency of the Central Processing Unit (CPU) associated with the one or more deployment hardware.

In an embodiment of the present disclosure, the one or more hardware processors are further configured to intelligently allocate the computational tasks to the one or more deployment hardware based on the extrapolated computational time and the energy requirements by applying pre-defined rules.

In an embodiment of the present disclosure, the predefined rules are based on computational complexity, latency constraints and processing power associated with the one or more deployment hardware It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which.

Figure 1:
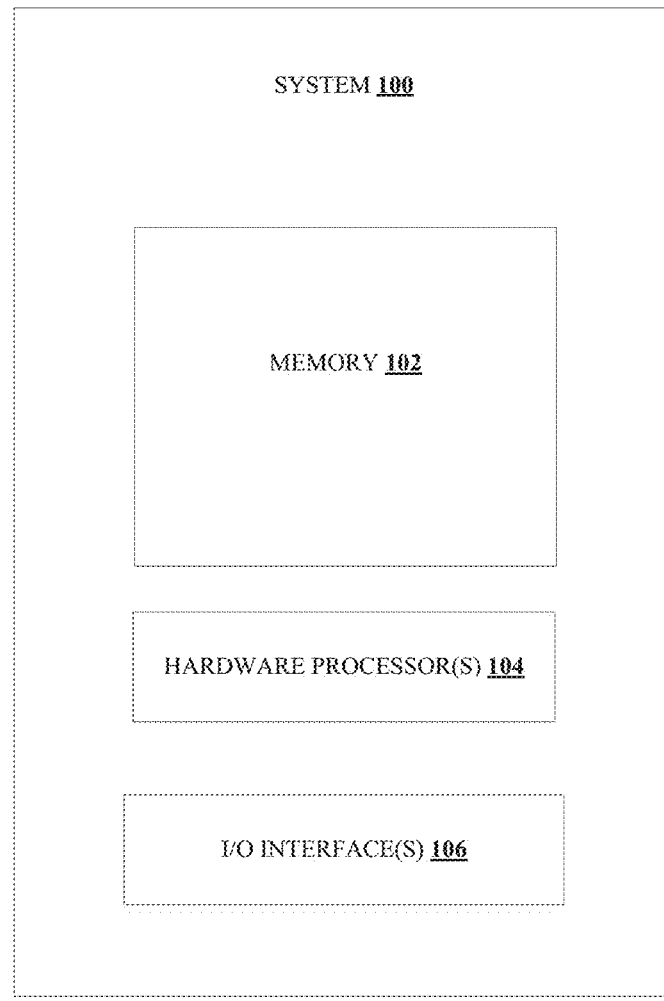
FIG. 1 illustrates an exemplary block diagram of a system for estimating computation times a-priori in fog computing robotics, in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

Autonomous robots are being deployed in multiple environments including home automation, smart manufacturing, healthcare and disaster management. As the robots are restricted by on-board computation, communication range and battery capacities, efforts to collaboratively increase their capacities is an active area of research. Networked Robotics is one such effort, where robots may link to an internet based infrastructure to seamlessly exchange data. Data may be autonomously exchanged or coordinated via a central control station. Alternatively, cloud robotics framework may be employed where robots make use of the cloud to offload computations. However, in case of applications requiring low latency actuation or with intermittent network connectivity, such an approach is not feasible. Processing and coordinating data using fog computing paradigm is an alternative option explored in the present disclosure. In accordance with the present disclosure, nodes such as smart gateways and peer robotic nodes located in proximity to robotic sensors may be used to offload expensive computations.

Mission planning and task allocation among a set of networked robots typically cannot be completed by a single robot and require multi-robot coordination and information exchange, for instance, collaborative mapping, industrial automation, and the like. In multi-robot deployments, events such as obstacle discovery or changes in path may trigger alternative actions. However, sensor data such as images, videos, maps, and the like, collected by on-board camera sensors are typically stored for offline processing. This limits runtime actuation that is needed in dynamic robotic or Internet of things (IoT) environments.

Given large computation that needs to be performed for a task, an autonomous robot may choose to perform the computation locally or offload it to other nodes. In accordance with the present disclosure, a set of offloading rules are incorporated, that consider computational complexity, latency constraints and device processing powers. Using accurate estimates of computation times on heterogeneous nodes, mission plans may be integrated in actual deployments running Robot Operating System (ROS) to ensure that the collected sensor data (images, videos, maps) are processed in near-real time for runtime actuation rather than offline analysis. Benefits of fog computing over cloud computing include Latency reduction, optimizing network bandwidth and improved reliability by distributing computation and storage.

Referring now to the drawings, and more particularly to FIGS. 1 through 12, where similar reference characters denote corresponding features consistently throughout the figures, there are shown preferred embodiments and these embodiments are described in the context of the following exemplary system and method.

FIG. 1 illustrates an exemplary block diagram of a system 100 for estimating computation times a-priori in fog computing robotics, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
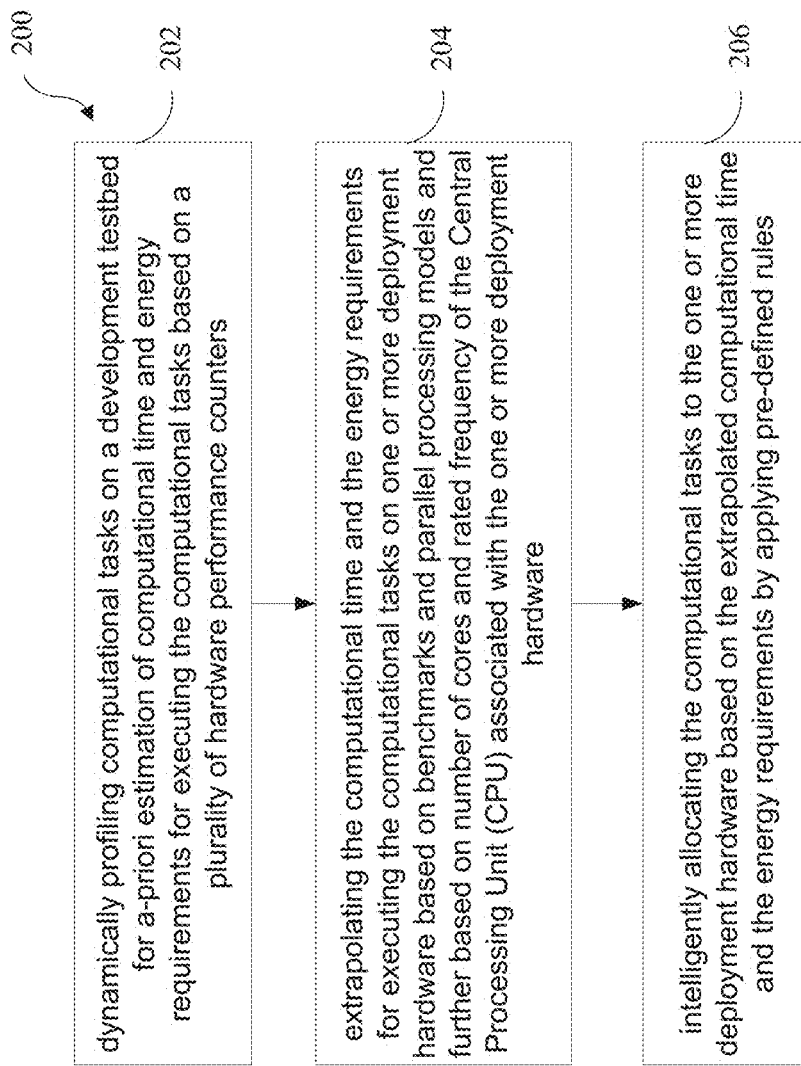
FIG. 2 is an exemplary flow diagram illustrating a computer implemented method for estimating computation times a-priori in fog computing robotics, in accordance with an embodiment of the present disclosure.

FIG. 2 is an exemplary flow diagram illustrating a computer implemented method 200 for estimating computation times a-priori in fog computing robotics, in accordance with an embodiment of the present disclosure. In an embodiment, the system 100 comprises one or more data storage devices or memory 102 operatively coupled to the one or more processors 104 and is configured to store instructions configured for execution of steps of the method 200 by the one or more processors 104.

Figure 3:
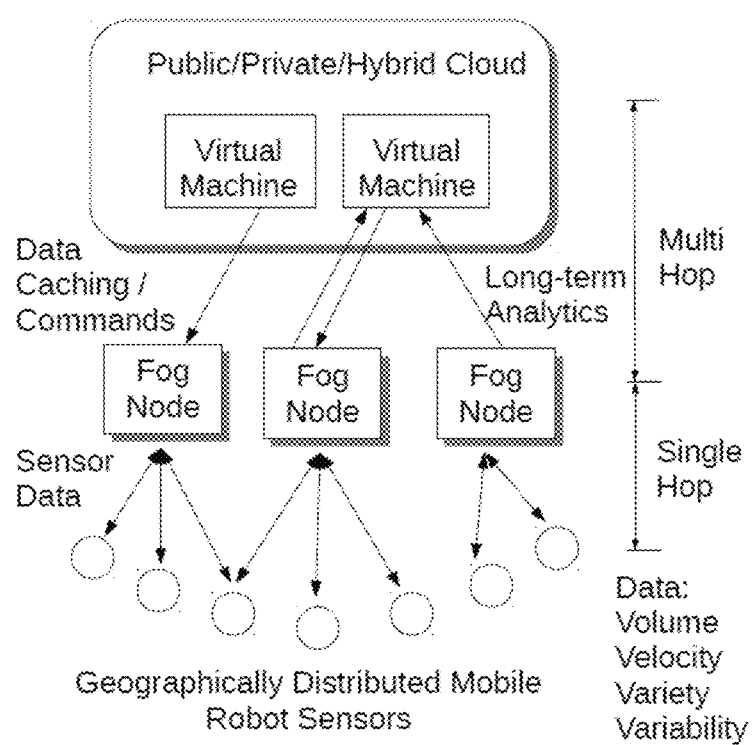
FIG. 3 illustrates a schematic representation of a general fog computing network as known in the art.

FIG. 3 illustrates a schematic representation of a general fog computing network as known in the art. Based on geo-located mobile sensor data, fog compute nodes (e.g. smart gateways) are deployed close to robotic sensor devices. Periodic snapshots or analytics on data are stored in a cloud data center. While the cloud may be used for long term analysis and goal setting, the geographically distributed set of mobile services make use of fog nodes for computation. Although advantages of offloading computation have been well studied, the present disclosure addresses timing analysis in embedded robotic nodes.

In accordance with an embodiment of the present disclosure, the one or more processors 104 are configured to dynamically profile, at step 202, computational tasks on a development testbed for a-priori estimation of computational time and energy requirements for executing the computational tasks. In an embodiment, the step of dynamically profiling computational tasks is based on a plurality of hardware performance counters.

CPU performance is an important performance measurement taken into consideration for profiling a computational task. With regards to performance of Central Processing Unit (CPU), important parameters that affect execution time include:
- CPU frequency, where a higher frequency implies better performance. Dynamic frequency scaling and associated aspects also require consideration.
- The number of cores present in the CPU configuration and the amount of multi-threading supported by the CPU.
- Instructions per clock cycle, which is dependent on the CPU instruction set.
- Cache size and hierarchy present with L1 cache access times being ~100× faster than memory access. Associated Random Access Memory (RAM) and size may also be considered.

Typical CPU quantitative comparisons make use of the following metrics:
- The CPU frequency f, which is the inverse of the clock rate for a machine. This is dependent on the CPU design and architecture.
- Total number of instructions l associated with a program, which is dependent on the compiler and program efficiency.
- Number of cycles per instructions (CPI) taken for the program execution. Given different types of instructions (Arithmetic Logic Unit, load, store, branch), the associated cycles per instruction $CPI_i$ and the fraction of total number of instructions $Fr_i$, the CPI is calculated as:

$$CPI = \sum_{i=1}^{n} CPI_i \cdot Fr_i \quad \rightarrow (1)$$

The execution time of the program is then derived as:

$$T = l \cdot CPI \cdot \frac{1}{f} \quad \rightarrow (2)$$

For programs running on specific CPUs, the Million Instructions Per Second (MIPS) Rating (Dhrystone Benchmark) may also be used to estimate the execution time as:

$$T = l \cdot \frac{1}{MIPS \cdot 10^6} \quad \rightarrow (3)$$

Dynamic profiling of program execution times are performed using tools such as Perf™ to obtain statistics such as instructions, operating frequency and instructions/cycle that are needed for equation 2. Additionally, Linux™ time command provides resident memory size of the application. An example output of Perf™ and time commands are given below.

Outputs of Perf™ and Time profilers:
118.813701 task-clock (msec) #0.107 CPUs utilized
293 context-switches #0.002 M/sec
1 cpu-migrations #0.008 K/sec
3,391 page-faults #0.029 M/sec
23,73,15,472 cycles #1.997 GHz
38,97,67,928 instructions #1.64 insns per cycle
6,05,34,858 branches #509.494 M/sec
13,55,124 branch-misses #2.24% of all branches
0 Average stack size (kbytes)
0 Average total size (kbytes)
33,912 Maximum resident set size (kbytes)
0 Average resident set size (kbytes)
1 Major (requiring I/O) page faults
3,415 Minor (reclaiming a frame) page faults
4,096 Page size (bytes)
Common CPU counters such as instructions/cycle, cycle/frequency, context switches and memory resident sets are reported.

It may be noted that most CPUs make use of dynamic frequency scaling to control the operating voltage and frequency depending on the utilization.

The commonly used "governors" to control this function include:
Performance: CPU set to the highest frequency.
Powersave: CPU set to the lowest frequency.
User-space: CPU set to user defined value.
On-demand: Varies CPU frequency depending on CPU utilization.

In accordance with the present disclosure, the performance governor is used primarily to compare CPUs.

While the use of CPIs and MIPS may be accurate for similar architectures, the effect of cache contention, page sizes, application profiles and parallel processing critical to task allocation. In an embodiment, CoreMark™ benchmark, a synthetic benchmark, provides ratings for multiple CPU architectures/processors and particularly tests the functionality of a processor core. CoreMark™ is not system dependent and produces a single-number score allowing comparisons between processors. CoreMark™ consists of ANSI C programs with realistic mixtures of read/write, integer and control operations. Commonly used algorithms such as matrix manipulations, linked list manipulations, state machine operations and Cyclic Redundancy Checks are included. It improves on the Dhrystone™ benchmark by reducing dependency on compiler optimizations and bias produced by benchmarking specific applications. The scores reported per Cores • MHz for various Intel, ARM and AMD processors are shown in Table I. Those shown in bold represent configurations of robotic/drone processors (described in hereinafter).

TABLE I

CoreMark™ benchmarks for various processors

| CPU Model | Freq.(MHz) | Cores | CoreMark/ (Cores · MHz) |
|---|---|---|---|
| Intel Atom 330 | 1600 | 4 | 1.42 |
| ARMv7 Processor | 600 | 1 | 2.04 |
| AMD Athlon 64 X2 | 2100 | 2 | 2.13 |
| Intel Core i3-2350M | 2300 | 2 | 2.30 |
| AMD Phenom II X4 | 2600 | 1 | 2.45 |
| AMD Opteron 254 | 2800 | 2 | 2.45 |
| ARM Cortex-A9 | 1400 | 4 | 3.97 |
| Intel Core i5-520M | 2400 | 2 | 6.47 |
| Intel Xeon E5 | 3400 | 16 | 7.36 |
| Intel Core i7-3930K | 3200 | 6 | 7.86 |

For resource constrained devices such as robots and drones, that typically have battery lifetimes in the range of minutes to a few hours, estimating the effect of running a computationally complex algorithm is critical. The present disclosure makes use of the Peukert's law that relates battery lifetime L and current drawn I, with parameters a and b. Typically the value of a is close to battery capacity and b is a value in the range [1.2, 1.7]. When using a non-uniform discharge, the average discharging values (over N samples) may be employed over time periods t:

$$L = \frac{a}{\left[\frac{\sum_{k=0}^{N} I_k (t_k - t_{k-1})}{L}\right]^b} \rightarrow (4)$$

Systems and methods of the present disclosure estimate performance across multiple hardware devices after running few runs of the device on one hardware without repeating profiling tests. In typical setups, programs are profiled on one specific hardware, rather than repeated deployment on heterogeneous devices. For instance, latency has been tested on ROS running on an Intel x86 i3 processor and runtime is to be estimated on other hardware platforms (AMD, ARM, other Intel CPU frequencies), a seamless technique for comparison is needed. Similarly, the right hardware and scale of resources may be selected, if this requirements are estimated beforehand. The ratio of runtimes on two processors is obtained using benchmarking ratios:

$$\frac{T_1}{T_2} = \frac{\left(\frac{CoreMark_2}{Cores_2 \cdot MHz_2}\right) \cdot f_2}{\left(\frac{CoreMark_1}{Cores_1 \cdot MHz_1}\right) \cdot f_1} \rightarrow (5)$$

where the CoreMark/(Cores·MHz) and CPU frequency f are used to derive ratios of computation times. It may be noted that for such comparison following assumptions are made: the compiler (and associated efficiency) is similar on devices; the scaling ratio is proportional to the CoreMark™ benchmark within acceptable deviation; memory, disk and network resources do not throttle CPU scaling.

The level of scale-up with increase in the number of cores is assumed to be nearly linear in the CoreMark™ benchmark. However, this is not realistic for all applications. In order to calculate the realistic speed-up due to parallelization, the systems and methods of the present disclosure make use of Gustafson's law:

$$\frac{T_1}{T_2} = 1 - p + \frac{T'_1}{T'_2} \cdot p \rightarrow (6)$$

where the observed speedup $$\frac{T_1}{T_2}$$

is dependent on the percentage p of the workload that can be parallelized along with theoretical improvement $$\frac{T'_1}{T'_2}.$$

Figure 4:
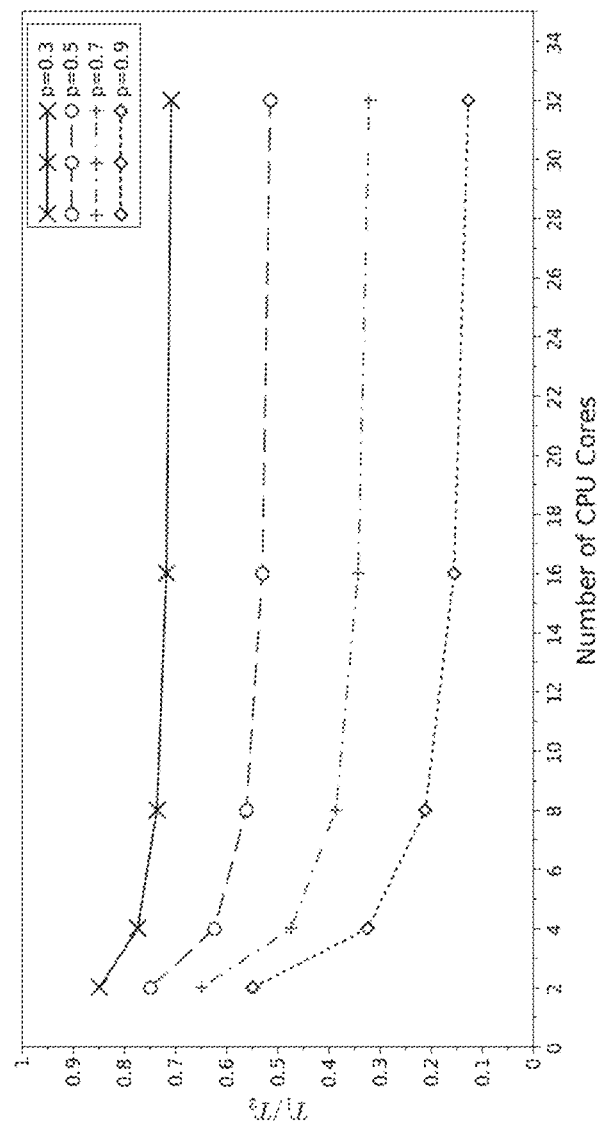
FIG. 4 illustrates timing ratio provided by Gustafson's law as known in the art.

The ratio $$\frac{T_1}{T_2}$$

for varying values of p is shown in FIG. 4 that illustrates timing ratio provided by Gustafson's law as known in the art. As observed, when compared to a 100 ms execution time on a single core processor, an algorithm with 30% parallelism would run within 75 ms on a 16 core processor; an algorithm with 90% parallelism would run within 15 ms on a 16 core processor.

Figure 5:
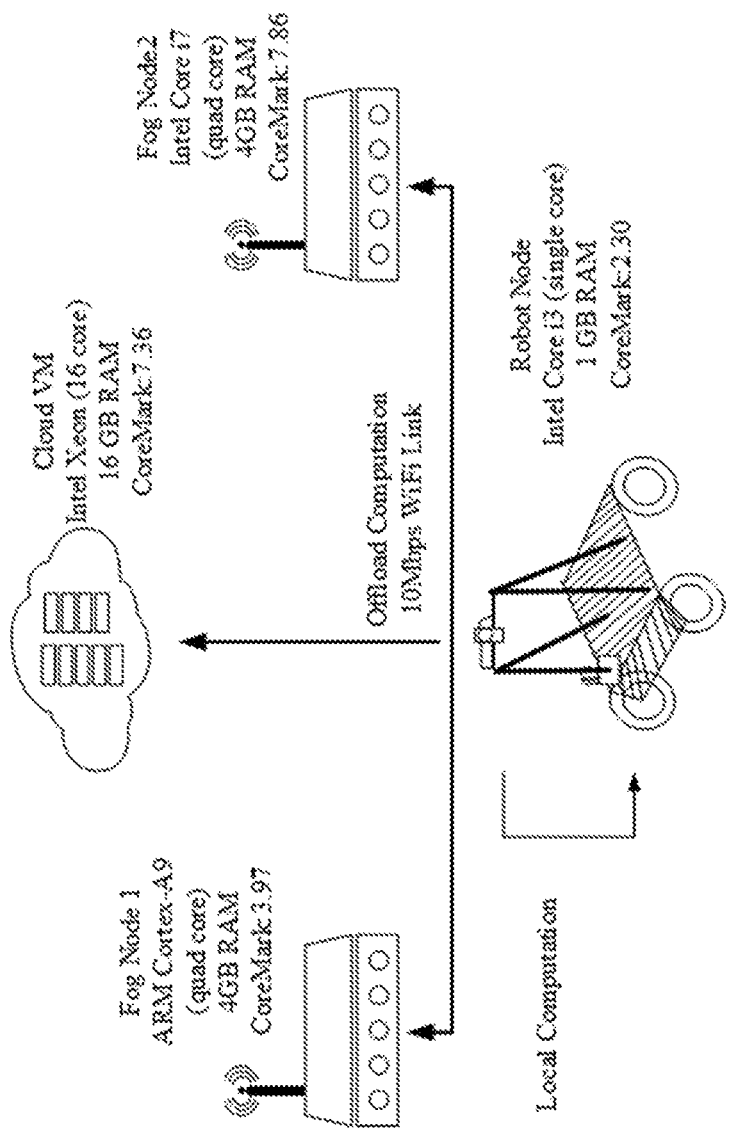
FIG. 5 illustrates a schematic representation of robots offloading computations onto fog/cloud nodes, in accordance with an embodiment of the present disclosure.
Figure 6:
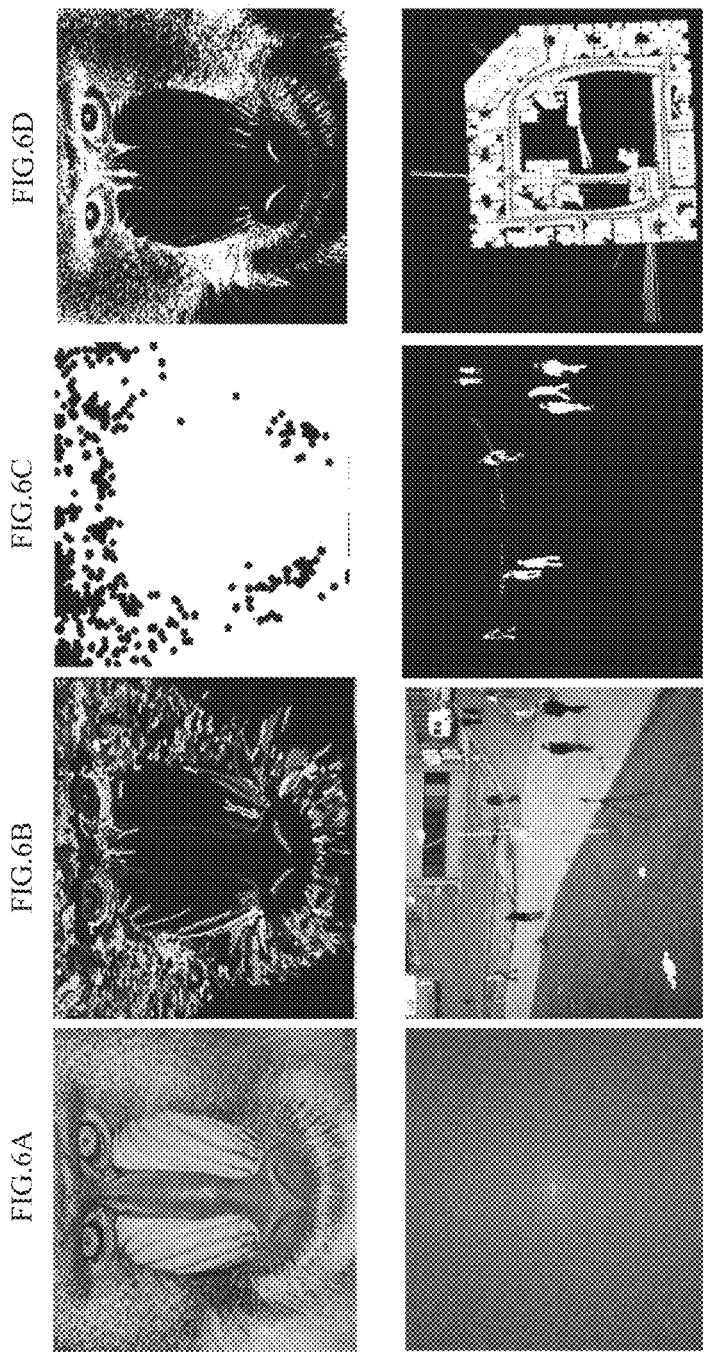
FIG. 6A illustrates an input image provided for image processing as known in the art.
FIG. 6B illustrates an output associated with the input image of FIG. 6A after contour generation.
FIG. 6C illustrates an output associated with the input image of FIG. 6A after edge detection.
FIG. 6D illustrates an output associated with the input image of FIG. 6A after thresholding.
FIG. 6E illustrates a Discrete Fourier Transform (DFT) of the input image of FIG. 6A as known in the art.
FIG. 6F illustrates an input video frame for video processing as known in the art.
FIG. 6G illustrates background separated from the input video frame of FIG. 6F after segmentation.
FIG. 6H illustrates GMapping performed on Intel™ Research Lab dataset.

In accordance with an embodiment of the present disclosure, the one or more processors 104 are configured to extrapolate, at step 204, the computational time and the energy requirements for executing the computational tasks on one or more deployment hardware based on benchmarks and parallel processing models. In an embodiment, extrapolating the computational time and the energy requirements is further based on number of cores and rated frequency of the CPU associated with the one or more deployment hardware. Accordingly, in order to incorporate both the benchmarking ratio in equation (5) and the parallelism in equation (6), the present disclosure combines the two equations into a composite model for timing improvement as:

$$\frac{T_1}{T_2} = 1 - p + \left(\frac{\left(\frac{CoreMark_2}{Cores_2 \cdot MHz_2}\right) \cdot f_2}{\left(\frac{CoreMark_1}{Cores_1 \cdot MHz_1}\right) \cdot f_1}\right) \cdot p \rightarrow (7)$$

that incorporates heterogeneous CPU architectures, CPU frequencies and level of application parallelism. In an embodiment, the one or more deployment hardware is heterogeneous and comprises one or more of robot nodes, fog nodes and cloud virtual machine nodes. FIG. 5 illustrates a schematic representation of robots offloading computations onto fog/cloud nodes, in accordance with an embodiment of the present disclosure. The robot moves around to collect data with on-board sensors such as location coordinates, orientation and obstacle mapping. The objective is to perform a computationally intensive task over a large dataset that has been collected, in order to provide actuation in a short time-frame (near-real time). As tasks are computationally expensive (e.g. indoor mapping), for limited capacity (CPU, memory, storage, battery) robots, collaborative techniques are necessary. To efficiently make use of fog and cloud nodes with typically heterogeneous capacities, it is important to group tasks that may be computed locally, on the fog or over the cloud nodes (options illustrated in in FIG. 5). Robotic mission plans such as the A*star algorithm typically consider movement and obstacle avoidance. However, in the case of networked fog robotics, mission plans must also consider runtime computation challenges. This involves processing image/video/mapping data online within time/energy constraints, in order to efficiently complete missions. Algorithm 1 herein below provides the method of the present disclosure that estimates the timing and energy requirements of a computational program, given heterogeneous processing hardware. Algorithm 1: Runtime offloading of computational tasks with timing constraints.
1 Input: Robot/UAV sensor data set; computational task; Testbed hardware; deployment configuration/hardware; time constraint;
2 Profile Computational task on Input dataset with testbed hardware;
3 Estimate processing time/energy requirements on target robot/fog/cloud nodes;
4 while Battery≠0 do
5 if Robot processing time Threshold then
   Compute Local Processing;
6 Else
   Offload to fog/cloud node for Processing;
7 Actuate Robot or UAV sensor;
8 Update Battery and Processing Capacities;
9 Output: Processed data within time constraints;
The present disclosure targets lines 2 through 6 where accurate timing analysis and extrapolation is applied for optimal runtime offloading of computations.

Table II below provides the datasheets for two robots (Husky and TurtleBot) along with Parrot AR Drone 2.0. As noted they have limited battery capacities, with most of this allocated to mechanical movement. They may run Intel or ARM processors with RAM sizes of a few GBs. These robots and drones are used along with multiple possible offloading option (Table I) to accurately estimate runtimes of algorithms.

TABLE II

Datasheets for Husky, TurtleBot, Parrot AR Drone Robots.

| Metric | Husky | TurtleBot | Parrot AR Drone 2.0 |
|---|---|---|---|
| External Dimensions | 990 × 670 × 390 mm | 354 × 354 × 420 mm | 517 × 517 × 127 mm |
| Weight | 50 kg | 6.3 kg | 420 g |
| Payload | 75 kg | 5 kg | 100 g |
| Max. Speed | 1.0 m/s | 0.65 m/s | 11.1 m/s |
| Battery | Sealed Lead Acid | Lithium Ion | Lithium Polymer 3S |
| Battery capacity | 24 V, 20 Ah | 12 V, 2200 mAh | 11 V, 1000 mAh |
| Runtime-Nominal usage | 3 hours | 1 Hour 15 Minutes | 12 Minutes |
| Sensors | Accelerometer, Gyroscope Camera | 3D Vision Sensor, Camera Accelerometer, Rate Gyrometer | Accelorometer, Gyroscope Stabilizer, Camera |
| Processor | Intel Core i7-3537U 3.1 GHz | Intel Core i3-4010U 1.7 GHz | ARM Cortex A8 1.0 GHz |
| Memory | 8 GB | 4 GB | 1 GB |

Robotic hardware presented in Table II is equipped with camera, gyroscope and odometry sensors to capture images, videos and runtime maps. The methods of the present disclosure are demonstrated over computational tasks such as multiple image and video processing algorithms that are typically implemented over software such as Open Source Computer Vision (OpenCV2). Further, the Simultaneous Localization and Mapping (SLAM) algorithms used by robots are analyzed. Using profiling tools, the computational tasks are analyzed. Running the computational tasks online is crucial for runtime actuation/re-planning of robotic tasks. The present disclosure provides some computational tasks that may be used in mission planning and typical outputs associated thereof.

Contour generation: Image contours may be used for shape analysis and object detection. A contour is a curve joining continuous points on an image that display similar color intensities. The contour detection function in OpenCV makes use of the binary image based contour detection algorithm. The function then draws contour outlines in the image if thickness ≥0 or fills the area bounded by the contours if thickness <0. FIG. 6A illustrates an input image provided for image processing as known in the art and FIG. 6B illustrates an output associated with the input image of FIG. 6A after contour generation.

Edge Detection: Detection of edges in an image is also a useful tool for image re-structuring. OpenCV edge detection makes use of the Harris algorithm. Given an input image of FIG. 6 (A), for each pixel (x, y), a gradient covariance matrix M(x,y) is calculated over a neighborhood. The following characteristic is then computed:

$$\text{edge}_{dst(x,y)} = |M^{(x,y)}| - k_r M^{(x,y)T2} \rightarrow \qquad (8)$$

where k is the Harris detector free parameter. Edges of the image are found as the local maxima of this map. FIG. 6C illustrates an output associated with the input image of FIG. 6A after edge detection.

Thresholding: Thresholding is one of the simplest segmentation techniques that allows separation of regions of interest in an image. This separation is based on the variation of intensity between the object pixels and the background pixels. This thresholding operation is expressed as:

$$\text{threshold\_dst}(x, y) = \begin{cases} 0 & \text{if } src(x, y) > \text{thresh} \\ MaxVal & \text{otherwise} \end{cases} \rightarrow (9)$$

If the intensity of the source pixel src(x, y) is higher than thresh, then the new pixel intensity is set to 0, else it is set to MaxVal. FIG. 6D illustrates an output associated with the input image of FIG. 6A after thresholding.

Discrete Fourier Transform (DFT): The Discrete Fourier Transform of an image decomposes samples into sine and cosine components. This transforms an image from its spatial domain to its frequency domain. The two dimensional DFT of an image with N×M pixels given by:

$$F(k, l) = \sum_{x=0}^{N-1} \sum_{y=0}^{M-1} f(x, y) e^{-j2\Pi\left(\frac{kx}{N} + \frac{ly}{M}\right)} \rightarrow (10)$$

where f(a,b) is the image in the spatial domain and F(k,l) in the image transformed into the Fourier space. Fourier transforms are used for image compression, convolution and sampling. FIG. 6E illustrates a Discrete Fourier Transform (DFT) of the input image of FIG. 6A as known in the art.

Video background separation: Background subtraction is a common technique used to generate a foreground mask of video frames. The technique implemented in OpenCV makes use of the Gaussian mixture-based Background/Foreground Segmentation Algorithm. Each background pixel is modeled by a mixture of K Gaussian distributions (K=3-5). The weights of the mixture represent the proportion of time that the colors are present on the scene—static colors for longer periods are identified as probable backgrounds. FIG. 6F illustrates an input video frame for video processing as known in the art and FIG. 6G illustrates background separated from the input video frame of FIG. 6F after segmentation.

SLAM GMapping: Building a robot map is a complex problem as robot localization requires an updated map and acquiring an updated map needs a good estimate of the robot's location. To solve this problem of simultaneous localization and mapping (SLAM), Rao-Blackwellized particle filters have been used in the GMapping algorithm. It estimates the joint posterior $p(t_{1:t}, m|o_{1:t}, u_{1:t-1})$ about the map m and the trajectory $t_{1:t}$ of the robot. This estimation is performed given the observations $o_{1:t}$ and the odometry measurements $u_{1:t-1}$ of the robot. GMapping then applies the following factorization:

$$p(t_{1:t}, m|o_{1:t}, u_{1:t-1}) = p(, m|o_{1:t}) \cdot p(t_{1:t}, m|o_{1:t}, u_{1:t-1}) \rightarrow \quad (11)$$

This factorization first estimates the trajectory of the robot and then computes the map given that trajectory. Multiple particles are computed where each particle represents a potential trajectory of the robot. Using observation likelihood, the most probable map and localization of the robot may be generated. A parallel version of this algorithm exploits the inherent parallelism in the particle filter algorithm for speed-up. FIG. 6H illustrates GMapping performed on Intel™ Research Lab dataset.

In accordance with the present disclosure, the execution times of image, video and map processing algorithms are analyzed when deployed on heterogeneous hardware. By exploiting the extrapolation step of 204, the execution times are predicted with increasing input sizes as well. This is then input to a runtime optimizer that determines the optimal offloading points for varying algorithmic complexities/input sizes. In an embodiment of the present disclosure, the one or more processors 104 are configured to intelligently allocate, at step 206, the computational tasks to the one or more deployment hardware based on the extrapolated computational time and the energy requirements by applying pre-defined rules. In an embodiment, the pre-defined rules are based on computational complexity, latency constraints and processing power associated with the one or more deployment hardware.

Experimental Data

Timing estimates: As robotic mission planners typically have access to only development hardware, the profiling of various algorithms must be carefully done a-priori, so that mission deployment timing constraints are met. In an embodiment, the profiling was performed on an Intel i5 2.3 GHz machine with the process restricted to one core with the Linux taskset command. The OpenCV programs are written in C++ and compiled using gcc Ubuntu 4.8.4. GMapping is programmed in java and compiled using openjdk version 1.8.0. The outputs of the Perf™ profiler on various video, image and map processing algorithms are presented in Table III herein below.

TABLE III

Performance counters for algorithms on a single-core Intel I5 (2.30 GHz) Processor.

| Perf Counter | Contour | Edge | DFT | Threshold | Video | GMapping |
|---|---|---|---|---|---|---|
| Input | Image (637 KB) | Image (450 KB) | Image (637 KB) | Image (450 KB) | Video (1.2 MB) | Map (20 KB, 10 particles) |
| CPU % used | 11 | 9 | 6 | 7 | 64 | 9.5 |
| Resident set | 33.9 | 38.5 | 35.1 | 30.5 | 144.9 | 227.7 |
| Context-switche | 0.002 | 0.004 | 0.003 | 0.002 | 0.002 | 0.2327 |
| CPU-migration | 0.008 | 0.000 | 0.000 | 0.016 | 0.002 | 0.000 |
| Cycles/sec (GHz) | 1.997 | 2.380 | 1.825 | 2.040 | 2.471 | 2.696 |
| Instructions/cycle | 1.64 | 1.21 | 1.45 | 1.02 | 2.00 | 1.76 |
| Branches | 509.494 | 432.331 | 399.522 | 327.925 | 615.562 | 261.967 |
| Instruction count | $3.89 \times 10^8$ | $2.65 \times 10^8$ | $2.23 \times 10^8$ | $1.34 \times 10^8$ | $3.09 \times 10^8$ | $7 \times 10^9$ |

Once the applications have been profiled with CPU execution times, instruction sets and operating frequency, estimates of runtimes on other hardware are predicted. In order to estimate the level of parallelism p, the algorithms are re-run on the same development machine (without taskset) to profile speedup on multi-core. For instance, for the Contour Mapping algorithm run on a single core, the output was provided after 30.4 milliseconds, while the same program running on a quad-core CPU needed 23 milliseconds. Inputing this into Gustafson's law (eq. 6), the level of program parallelism was calculated:

$$p = \frac{4}{3} \cdot \left(1 - \frac{23}{30.4}\right) = 0.32 \quad (12)$$

The small level of bias introduced due to compiler optimization and specific CPU architectures on the development hardware is mitigated due to the CoreMark benchmarking ratios in equation (7). For instance, estimation of computation times of Contour Detection on Core i7 3.2 GHz processors is given by (refer to CoreMark™ ratios in Table I):

$$T_{i7} = \left(1 - 0.32 + \frac{6.47 \cdot 1997}{7.86 \cdot 3200} \cdot 0.32\right) \cdot 30.4 = 25.67 \text{ msec} \quad \rightarrow (13)$$

which is a more conservative estimate when compared to the 15.62 msec. value given directly from equation (5). It may be noted that other metrics such as memory, disk and network utilization were monitored and any significant overheads were not noticed.

Figure 7:
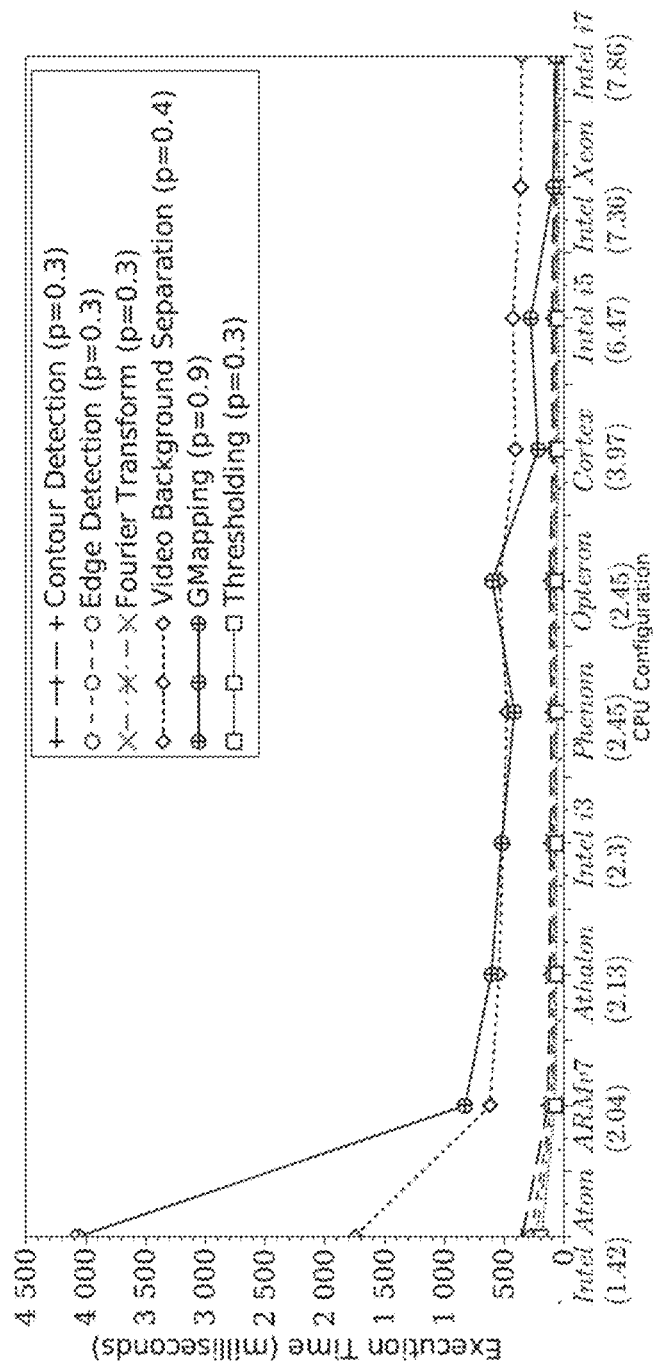
FIG. 7 illustrates a graphical representation of execution times on differing hardware.

Equation (7) is used to perform the analysis in FIG. 7 that illustrates a graphical representation of execution times on differing hardware. The CoreMark™ benchmarking data in Table I is used as an input. This effectively captures the differing cores, CPU frequency, cache size and architectural impacts of varying CPU configurations. It may be noted that the Performance frequency governor is used for the estimation (no dynamic frequency scaling). As expected, processors with higher CoreMark™ scores have lower execution times for most algorithms. Significant difference was noticed in processing times for the GMapping algorithm, as the level of parallelism is close to 90%. Such estimates can prove useful for both choosing hardware for robotic, fog, cloud nodes as well as selecting suitable offloading locations at runtime. For instance, it may be noticed from FIG. 7 that an Intel i5 processor would be more suitable for video background separation compared to an Intel Atom processor; however, there may not be significant changes for other applications such as contour/edge detection of images.

Figure 8:
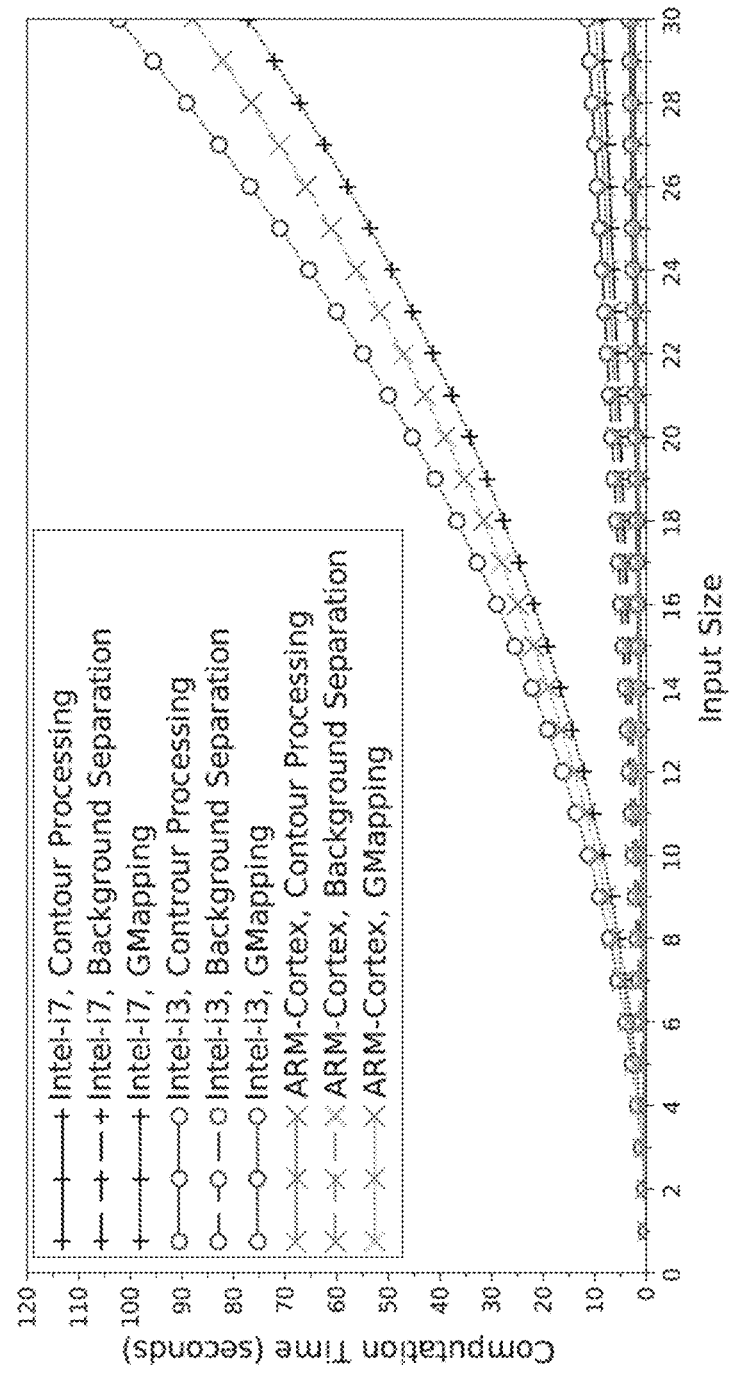
FIG. 8 illustrates a graphical representation of computation times with increasing input sizes.
Figure 9:
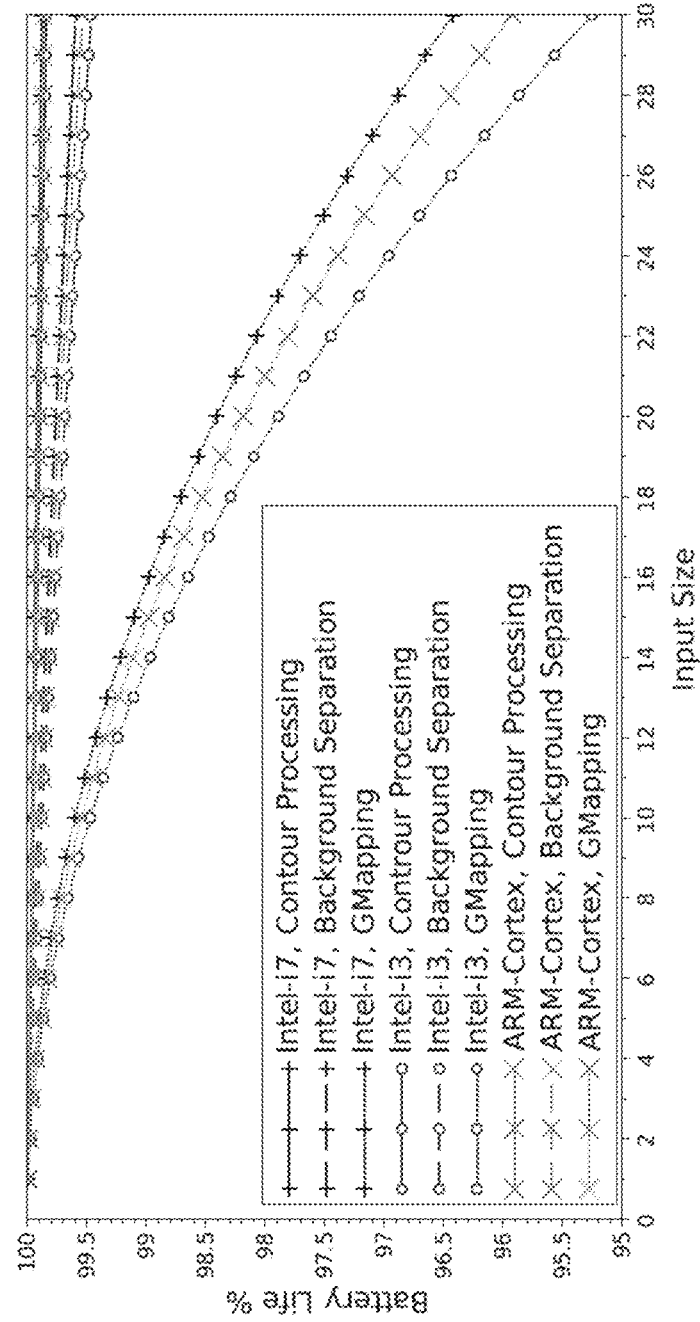
FIG. 9 illustrates a graphical representation of battery life depletion with increasing input sizes.

Increasing data sizes: The present disclosure takes into account the variation of execution time with increasing size/number of input data. Typically this is calculated using the Big-O notation for average time complexity. Other computational models include tools such as trend Perf™. This is also dependent on the efficiency of algorithmic implementation and the compliers used. The effect of increasing input size is estimated on robotic and UAV hardware described in Table II. Profiled outputs in Table III and the CoreMark ratios are used to extract these values. FIG. 8 illustrates a graphical representation of computation times with increasing input sizes. As shown in FIG. 8, the computationally intensive GMapping algorithm with average complexity O(Number of Particles×Map size) scales worse with increase in number of maps, when compared to Video Background Separation with average complexity O(Number of Frames×log(Background Threshold Frame)) and Contour Mapping with average complexity O(Number of Images). By making use of Peukert's law (equation 4) and allocating 20% of energy to computations (rest allocated for movement, sensing), the reduction of battery lifetimes is estimated for higher input loads. FIG. 9 illustrates a graphical representation of battery life depletion with increasing input sizes, with the compute intensive GMapping producing most battery drain. Especially for drone deployments, such an application is a suitable candidate for offloading. Effectively offloading these computationally intensive tasks with efficient scheduling would prove beneficial. Based on the time and energy needed for such computations, runtime decisions may be taken on local, fog or cloud based deployments.

Optimal Runtime deployments: Accurate profiling inputs were assumed for each device, which is not possible in all cases. The extrapolation and timing analysis models of the present disclosure are used as inputs for runtime optimizations. A binary integer programming formulation based on FIG. 5 in lpsolve format is provided below:
/* Minimize Objective Function */min:
r+4 f1+4 f2+16 c;
/* Subject to */
/* CPU Execution Time Constraints */
100 r+65.5 f1+77.5 f2+53 c<=2000;
/* Memory Size Constraints */
40 r<=1000;
40 f1<=4000;
40 f2<=4000;
40 c<=16000;
/* Robotic Battery Constraints */
5 r<=120;
/* Single Computation Node Constraints */
r+f1+f2+c=1;
/* Binary Integer Constraints */
bin r;
bin f1;
bin f2;
bin c;
It was observed, allocation of a computing task may be done to either to the local robotic node (r), two possible framework allocates one of the hardware resources to a particular task (without distributed computation). All the nodes have differing resources (FIG. 5) that could be traded-off with cost utility. As specified in the above optimization formulation, offloading to the fog has 4× utility cost and to the cloud has 16× utility cost; these are traded-off with faster processing times and extended energy capacities. The constraints are typically specified in terms of latency, which should be satisfied by the optimization solver. The CPU execution time constraints are set based on our computation time analysis (with additional latency for WiFi data transfer). The optimized output is given:
/* Output */
Value of objective function: 1
Actual values of the variables:

| | |
|---|---|
| r | 1 |
| f1 | 0 |
| f2 | 0 |
| c | 0 |

To analyze the effect of applying the optimization formulation to the image, video and map processing algorithms described above, three cases were considered for the configurations specified in FIG. 5, with the robotic node having lower computational capacity when compared to the Fog and Cloud nodes.

Case 1: Image processing algorithms such as Thresholding deployed with varying number of images (image size 637 KB) at runtime.

Figure 10:
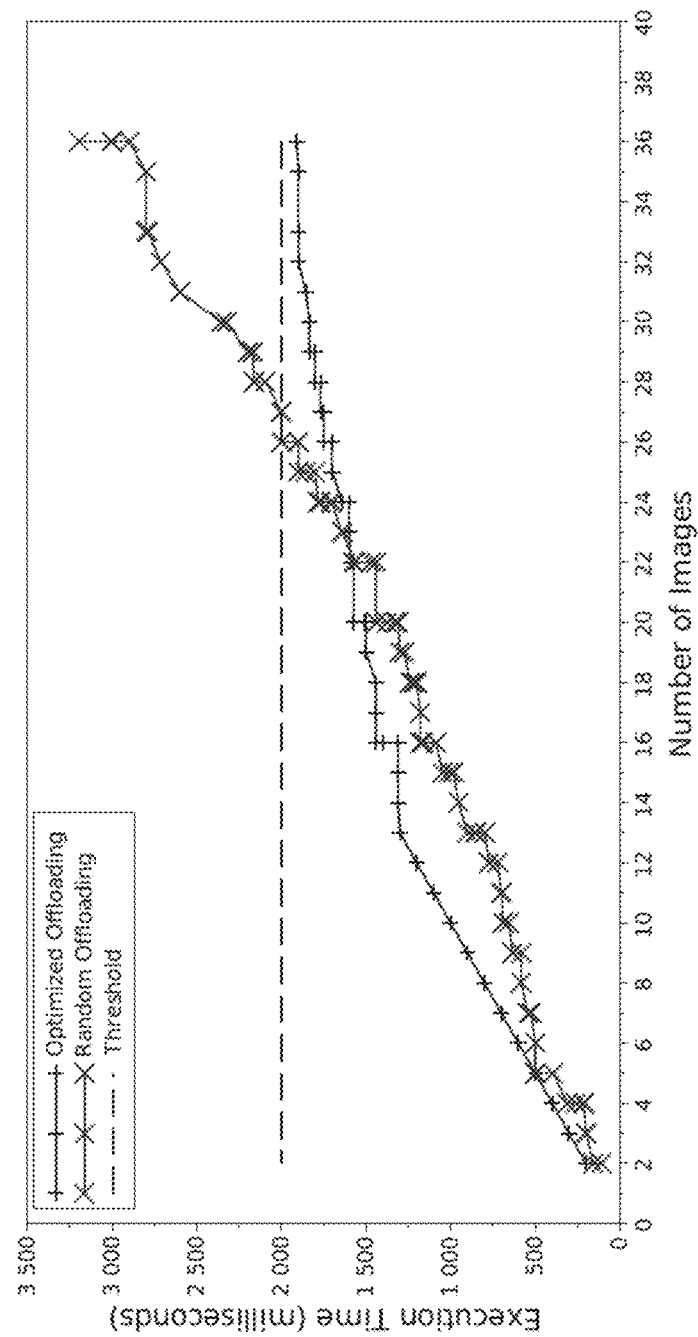
FIG. 10 illustrates a graphical representation of time constrained offloading of image thresholding.

The processing time is constrained to a threshold of 2 seconds in all cases. As seen in FIG. 10, compared to random offloading (randomly assign device tasks irrespective of data size, timing estimates, computation capacities) of computations of these devices, the optimization formulation produced an improvement of 33% in the number of images that could be processed within 2 seconds.

Figure 11:
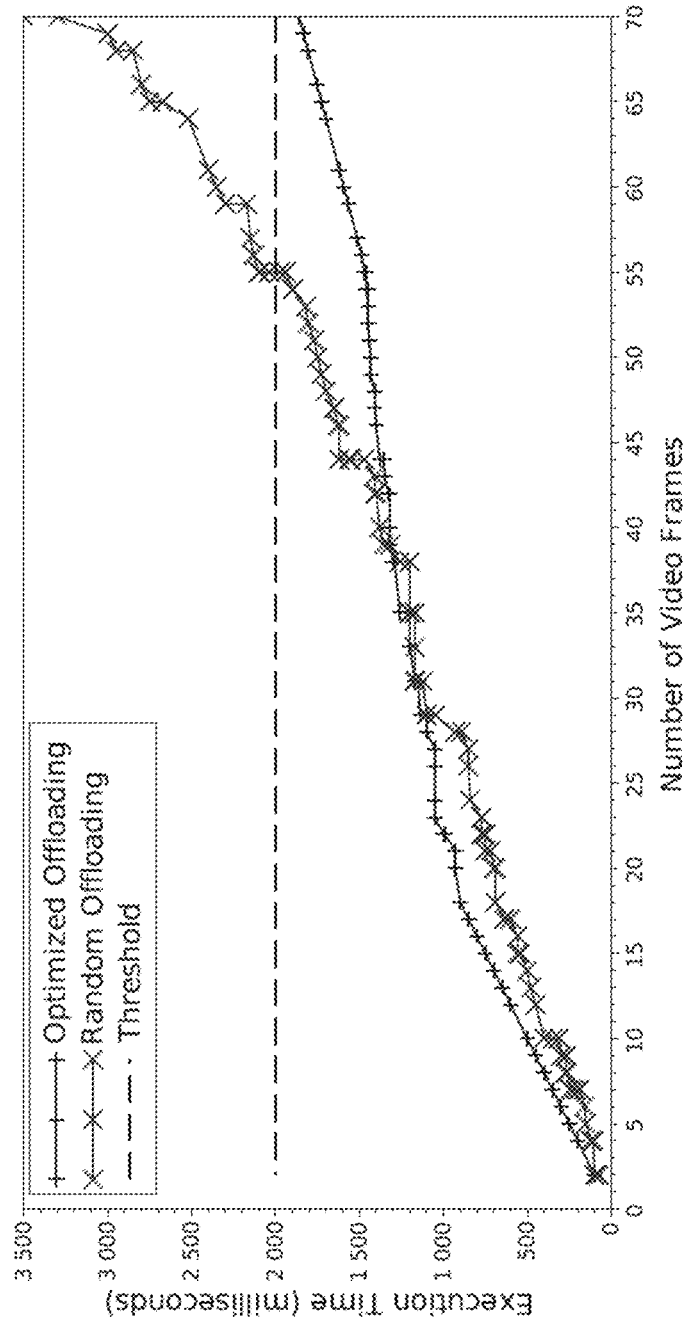
FIG. 11 illustrates a graphical representation of time constrained offloading of video background separation.

Case 2: Video processing algorithms such as Background Separation are deployed with varying number of video frames (video size 0.12 MB/frame) at runtime. The processing time is constrained to a threshold of 2 seconds in all cases. FIG. 11 illustrates a graphical representation of time constrained offloading of video background separation. As seen in FIG. 11, compared to random offloading of computations of these devices, the optimization formulation produced an improvement of 27% in the number of video frames that could be processed within 2 seconds.

Figure 12:
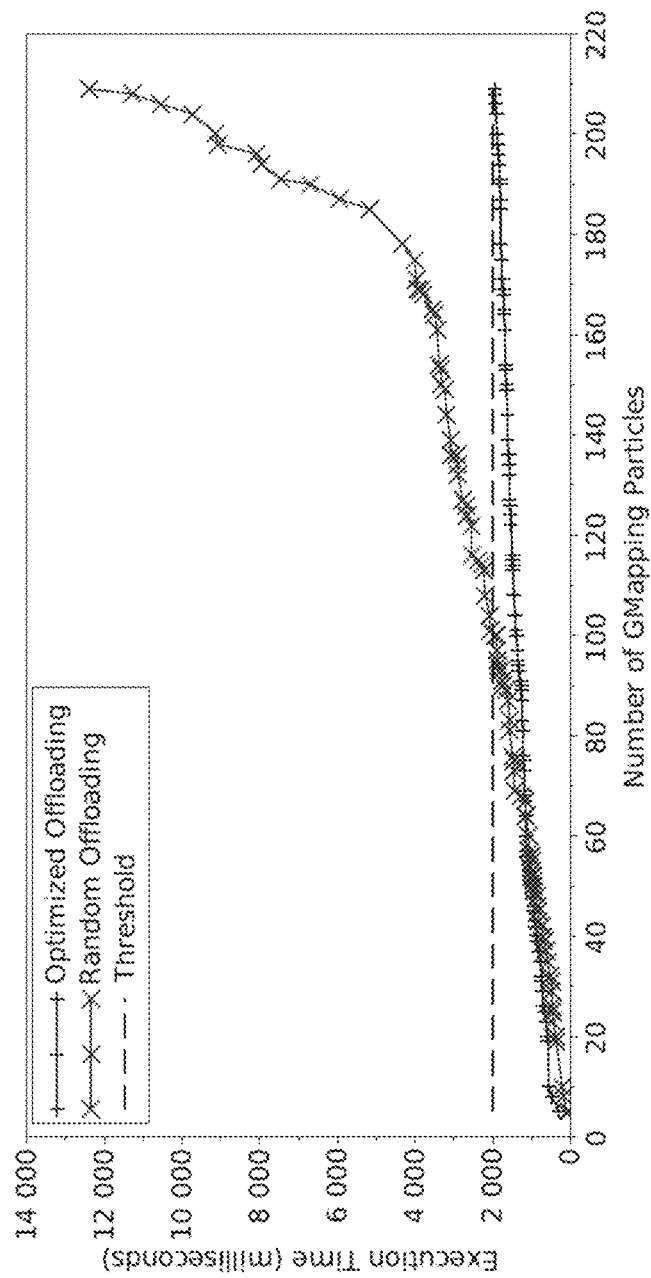
FIG. 12 illustrates time constrained offloading of GMapping.

Case 3: GMapping is deployed on the Intel Dataset with increasing number of Rao-Blackwellized particles at runtime. The processing time is constrained to a threshold of 2 seconds in all cases. As seen in FIG. 12, compared to random offloading of computations of these devices, the optimization formulation produced an improvement of 95% in the number of particles that could be processed within 2 seconds.

Thus the efficacy of accurate profiling and estimation of timing constraints on runtime applications is demonstrated. The formulae of the present disclosure may be extended to other domains such as reducing battery consumption or optimally utilizing network bandwidth.

Robotic Mission Plans: Multi-robot mission plans are needed for complex tasks and typically cover obstacle avoidance, shortest path to goals and so on. With the emergence of network based offloading to peer and fog nodes, mission plans require extensions to incorporate efficient offloading mechanisms. One possible set of rules are provided using switch-case based constructs below:

select Computation, Computation_Constraint(Time,Battery)
   case Time(Local_Computation)<=Time_Constraint &
     Energy(Local_Computation)<=Battery_Constraint
     then Deploy_Computation_Locally;
   case Time(Fog_Computation)<=Time_Constraint then
     Offload_Computation_Fog;
   case Time(Cloud_Computation)<=Time_Constraint then
     Offload Computation Cloud;
else
   Computation_Constraint Not_Satsfied;
end The importance of accurate profiling and estimation of computation times/energy
consumptions may be noted in setting these runtime rules. If the Time_Constraint is satisfied by the Local_Computation, it is run on-board; else, the computation is offloaded hierarchically to Fog_Computation or Cloud_Computation.

In summary, before deploying any computationally intensive task on resource constrained devices, it is essential to examine approximate computational times and battery consumptions. This is especially crucial in the case of embedded IoT or robotic devices that are tightly coupled with computational and energy constraints. The computation times are estimated over varying data sizes and computational complexities. Further, using a binary integer programming approach, tasks are intelligently allocated to nodes. In accordance with the present disclosure, rather than naive computational offloading, intelligent allocation of tasks to robots/peers/Fog/Cloud nodes improves both computational latency and energy efficiency.

If the execution times for three possible devices for computational offloading are T2, T3 and T4, respectively, tasks may be distributed with reference to equation (7) described herein above in the ratio 1: (T2/T3):(T2/T4). This ensures that all assigned sub-tasks complete synchronously. As an example, if T2=10 ms T3=12 ms and T4=20 ms, allocation of tasks will be in the ratio 1:0.83:0.5 or normalized 43%:36%:21%.

In accordance with the present disclosure, computational tasks are identified in a development environment. Using profiling tools execution times of runtime computations are accurately measured on development testbeds. Statistics may be collected by re-running on single and multi-core processors using taskset to estimate level of parallelism (Equation 6). By making use of performance benchmarking tools, processing times on heterogeneous robot/Fog/Cloud deployment hardware (FIG. 5) are estimated with varying data sizes as well. Synthetic benchmark (CoreMark™) of development and deployment environments are collected (Table I). Timing bounds on deployment hardware is estimated using level of parallelism and CoreMark™ ratios (Equation 7). Battery depletion rates for the robotic/fog nodes are estimated using Peukert's law (Equation 4). Effect of increasing input sizes is estimated using computational complexity of trend Perf™ outputs. Constraints for optimal offloading at runtime are set. The robot is then deployed in the fog networked environment and the outputs/constraints are monitored. Constraints and timing behavior may be re-evaluated in case of repeated deviations. Methods and systems of the present disclosure thus allow determining optimal computational offloading strategies given differing computational complexities, data sizes, parallel processing and heterogeneous devices.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method (200) comprising:
dynamically profiling computational tasks on a development testbed for a-priori estimation of computational time and energy requirements for executing the computational tasks based on a plurality of hardware performance counters (202); and
extrapolating the computational time and the energy requirements for executing the computational tasks on one or more deployment hardware based on benchmarks and parallel processing models and further based on number of cores and rated frequency of the Central Processing Unit (CPU) associated with the one or more deployment hardware (204);
dynamically allocating the computational tasks to the one or more deployment hardware based on the extrapolated computational time and the energy requirements by applying pre-defined rules.

2. The processor implemented method of claim 1, wherein the one or more deployment hardware is heterogeneous and comprises one or more of robot nodes, fog nodes and cloud virtual machine nodes.

3. The processor implemented method of claim 1, wherein the pre-defined rules are based on computational complexity, latency constraints and processing power associated with the one or more deployment hardware.

4. A system (100) comprising:
one or more data storage devices (102) operatively coupled to one or more hardware processors (104) and configured to store instructions configured for execution by the one or more hardware processors to:
dynamically profile computational tasks on a development testbed for a-priori estimation of computational time and energy requirements for executing the computational tasks based on a plurality of hardware performance counters; and
extrapolate the computational time and the energy requirements for executing the computational tasks on one or more deployment hardware based on benchmarks and parallel processing models and further based on number of cores and rated frequency of the Central Processing Unit (CPU) associated with the one or more deployment hardware;
intelligently allocate the computational tasks to the one or more deployment hardware based on the extrapolated computational time and the energy requirements by applying pre-defined rules.

5. The system of claim 4, wherein the one or more deployment hardware is heterogeneous and comprises one or more of robot nodes, fog nodes and cloud virtual machine nodes.

6. The system of claim 4, wherein the pre-defined rules are based on computational complexity, latency constraints and processing power associated with the one or more deployment hardware.

7. A computer program product comprising a non-transitory computer readable medium having a computer readable program embodied therein, wherein the computer readable program, when executed on a computing device, causes the computing device to:
dynamically profiling computational tasks on a development testbed for a-priori estimation of computational time and energy requirements for executing the computational tasks based on a plurality of hardware performance counters; and
extrapolating the computational time and the energy requirements for executing the computational tasks on one or more deployment hardware based on benchmarks and parallel processing models and further based on number of cores and rated frequency of the Central Processing Unit (CPU) associated with the one or more deployment hardware;
intelligently allocating the computational tasks to the one or more deployment hardware based on the extrapolated computational time and the energy requirements by applying pre-defined rules.

* * * * *